United States Patent [19]

Boisseuil et al.

[11] Patent Number: 4,464,332
[45] Date of Patent: Aug. 7, 1984

[54] DEVICE FOR CONTROLLING THE DIMENSIONS AND SPACED APART RELATIONSHIP OF RIGID PIECES DISPOSED IN A BUNDLE

[75] Inventors: Lucien Boisseuil, Fontenay-Aux-Roses; Pierre Luciani, Villiers Le Bacle; René Merard, Igny, all of France

[73] Assignee: Commissariat a l'Energie Atomique, Paris, France

[21] Appl. No.: 322,011

[22] Filed: Nov. 16, 1981

[30] Foreign Application Priority Data

Nov. 26, 1980 [FR] France .................. 80 25067

[51] Int. Cl.³ .............................................. G21C 7/36
[52] U.S. Cl. ................................ 376/215; 376/248; 250/227; 356/375
[58] Field of Search ............... 376/215, 248; 250/227, 250/561; 356/375, 384, 387

[56] References Cited

U.S. PATENT DOCUMENTS 3,922,094 11/1975 Colding ........................ 356/375
4,275,296 6/1981 Adolfsson .................... 250/227

FOREIGN PATENT DOCUMENTS 0018026 10/1980 European Pat. Off. .
2279067 2/1976 France .
2298859 9/1976 France .
2430595 2/1980 France .
2469697 5/1981 France .

*Primary Examiner*—Donald P. Walsh
*Attorney, Agent, or Firm*—Pearne, Gordon, Sessions, McCoy, Granger & Tilberry

[57] ABSTRACT

The present invention relates to a device for controlling the dimensions and spaced-apart relationship of rigid pieces disposed in a bundle. Said device comprises: two supple probes adapted to transmit a light beam and insertable between rows of pieces so as to surround one of these rows; means for positioning and displacing these probes; a source of light emitting a light beam transmitted by the first probe then picked up by the second transmitting it to a photodetector producing an electrical signal; electronic means for processing this signal, furnishing information making it possible to control, from reference values, the dimensions and spaced apart relationship of the pieces, due to the modulation of said signal, provoked by the successive occultations of the light beam by the pieces, during the displacement of the probes along the row of pieces. The invention is applicable to the control of the pencils of a fuel assembly of a nuclear reactor.

22 Claims, 11 Drawing Figures

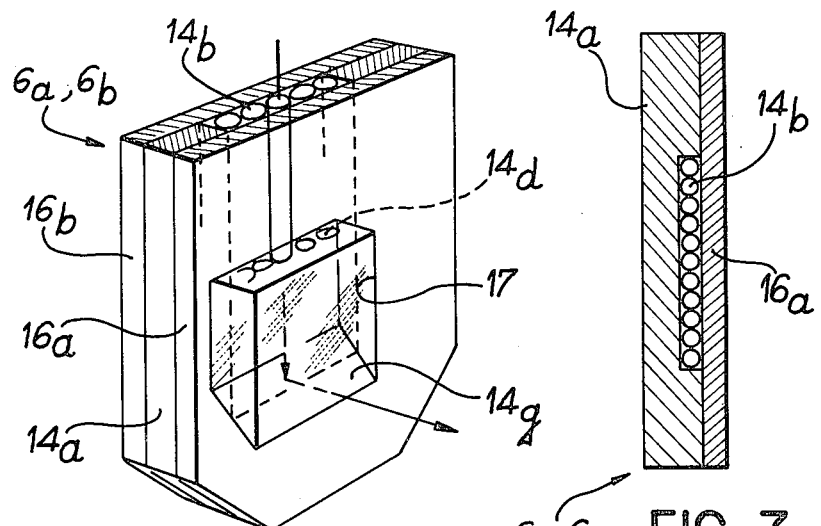
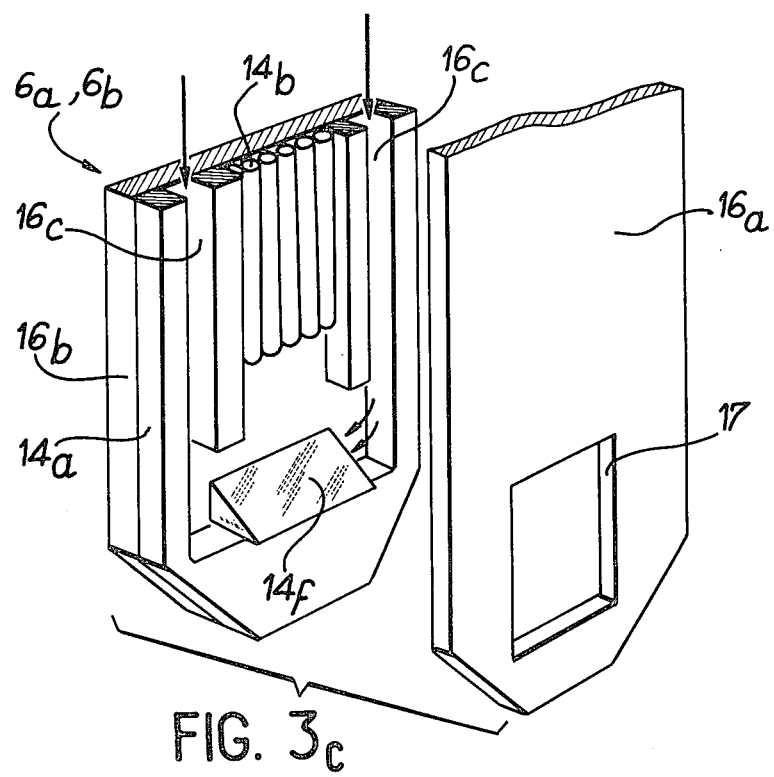
FIG. 3a  FIG. 3b  FIG. 3c

DEVICE FOR CONTROLLING THE DIMENSIONS AND SPACED APART RELATIONSHIP OF RIGID PIECES DISPOSED IN A BUNDLE

The present invention relates to a device for controlling the dimensions and spaced-apart relationship of rigid pieces disposed in a bundle, which is regular or not. It is particularly applicable to the control of the diameter and spaced-apart relationship of the "pencils" of a fuel assembly of a nuclear reactor.

It is known that, in such a reactor, the fuel is contained in metallic tubes or bars called "pencils", grouped in parallel in bundles or "assemblies", for example of square section. In a fuel assembly which is not irradiated, the pencils of diameter ranging from 9.5 to 10.5 mm are regularly spaced apart and separated from from another by gaps of about 1.3 to 3.5 mm. Grids, disposed perpendicularly to the pencils and distant from 0.3 to 1 m, make it possible to maintain the assembly whose height may vary between 1.5 and 5 m. These grids are maintained in position by guide tubes of diameter greater than that of the pencils.

It is important to be able to control the diameter and spaced apart relationships of all the fuel pencils of an assembly after manufacture thereof or after its use in a nuclear reactor, to assess the passage between pencils.

A device for controlling a fuel assembly is described in French Patent Application No. 75 01924, but this is a device using an endoscope which enables only a visual control of the assembly to be made. This endoscope is with direct vision, without possibility of sliding in a non-rectilinear passage of the assembly and it is associated with a mechanical feeler device measuring the diameter and spaced apart relationship of the fuel pencils, but the endoscope-feeler device assembly is not easy to use and has only been designed for controlling a fuel assembly immersed in the pool of a nuclear reactor or in a cooling pond. Moreover, the endoscope and the feeler device are rigid and therefore hindered by the guide tubes also disposed in the fuel assembly in place of certain pencils.

It is an object of the present invention to remedy these drawbacks and to make real-time or off-line dimensional measurements with the aid of digital electronic means.

The invention relates to a device for controlling the dimensions and spaced apart relationship of rigid pieces disposed in a bundle of rows allowing probes to penetrate, characterised in that it comprises:
at least one pair of probes adapted to transmit a light beam and insertable between the rows of pieces, so as to surround one of these rows, and for each of these pairs:
means for displacing the probes along the rows of pieces;
a source of light emitting a light beam transmitted by the first probe then picked up by the second transmitting it to a photodetector producing an electrical signal, and
electronic means for processing this signal, furnishing information making it possible to control, from reference values, the dimensions and spaced apart relationship of the pieces, due to the modulation of said signal, provoked by the successive occulations of the light beam by the pieces, said occulations obtained by the displacement of the probes along the row of pieces.

These pieces may be of any form. They may for example be cylindrical and deformed or not; (cylindrical piece is understood to mean any piece whose outer surface may be generated by a straight line bearing on a closed curve and remaining parallel to a given direction).

The pieces to be controlled are disposed in a bundle, regular or not, i.e. form rows which are parallel to one another or not, allowing penetration of probes. The distance between two rows may thus be variable. The same applies to the distance between two pieces. Furthermore, these pieces may have different dimensions: for cylindrical pieces, the closed curve mentioned above may have a variable surface from one piece to the other.

In the case of non-irradiated fuel pencils, this closed curve is a circle. The device forming the subject matter of the invention then makes it possible to control the diameter of these pencils (as well as the spaced apart relationship therebetween) before and after irradiation, the latter provoking deformations of the pencils (for example swellings).

The probes enable pieces of different dimensions to be controlled: these probes therefore have a certain "suppleness" since they must be able to "surround" several pieces whose dimensions are different, at a time.

According to a particular feature of the invention, at least two standard pieces, corresponding to the controlled row, are disposed on the path of the probes to effect control by comparison of the information concerning the pieces with that concerning the standard pieces. These standard pieces act as references, which implies a surface state and a geometry identical to those of the pieces to be controlled (this geometry not necessarily being of revolution).

The device according to the invention may further comprise a retractable mechanical feeler, provided to locate the first row of pieces presenting itself for control.

According to another particular feature of the invention, the latter further comprises probe guiding means in order to facilitate the introduction of said probes in the bundle of pieces and also to avoid deflection and deterioration thereof during this introduction.

These probes preferably comprise a flexible blade provided with a light conduit and terminated by means for deflecting this light normally to the plane of the blade.

According to a particular feature of the invention, the flexible blade is surrounded by two protecting blades which are, themselves, flexible, one of which is perforated opposite the deflection means. According to another particular feature of the invention, the flexible blade is grooved in order thus to form said light conduit and a protecting blade, itself flexible, is, on the one hand, fast with the flexible blade, so that the light conduit is surrounded by the two blades, and on the other hand perforated opposite the deflection means.

For example, in the case of a fuel assembly, the pair of probes comprising these protected flexible blades thus enables any pencil of this assembly to be controlled: when a tube guide presents itself, the blades deform and "pass around" it due to their flexibility.

The second probe picking up the light beam transmitted by the first receives only that part of the light flux which strikes the deflection means, due to the perforation opposite said deflection means. All the phenomena which enlarge the incident light beam are thus avoided.

The deflection means may for example consist of a prism of a mirror, plane or focusing, inclined at 45° with respect to the axis of the light conduit and to the plane of the flexible blade. The light conduit may comprise a bundle of optical fibres. In this case and when the deflection means consist of a mirror inclined at 45° with respect to the axis of the optical fibres and to the plane of the flexible blade, a transparent material may be interposed between the optical fibres and the plane mirror.

The probes may be further provided with at least one channel for conducting, in the vicinity of the deflection means, a fluid adapted to regularise these deflection means, i.e. to enable them at any instant to deviate the incident light beam correctly. To this end, said fluid cleans these deflection means, for example, or cools them, thus avoiding deformation thereof.

According to a particular feature of the invention, the electronic means comprise:
a circuit for amplifying and shaping the signal issuing from the photodetector,
a derivative circuit for the amplified and shaped signal,
an incremental coder coupled to the probe displacement means and furnishing electrical pulses whose number is proportional to the displacement of the probes along a row of pieces,
means for counting the number of pulses corresponding to a piece and the number of pulses corresponding to the distance between two pieces, these counting means being connected to the output of the incremental coder and to that of the amplifying and shaping circuit,
a memory for recording these numbers of pulses,
means for controlling this memory connected to the output of the counting means and to that of the derivative circuit, and
means for processing the information contained in the memory.

Said processing means may be display means: the information contained in the memory (number of pulses corresponding to each piece and to each distance between pieces of a row along which the probes are displaced) may be printed on paper or recorded on a screen. It may also be stored on punched tapes if it is not desired to exploit it immediately.

Said counting means comprise, for example:
a first gate of AND type of which one input is connected to the output of the incremental coder and of which the other input is connected to the output of the amplifying and shaping circuit,
an inverter circuit of which the input is connected to the output of the amplifying and shaping circuit,
a second gate of AND type of which one input is connected to the output of the incremental coder and of which the other input is connected to the output of the inverter circuit, and
a pulse counter of which the input is connected to the output of the two gates of AND type and of which the output is connected to the means for controlling the memory.

In a particular embodiment, the device forming the subject matter of the invention comprises a plurality of pairs of associated probes disposed along at least one flat level perpendicular to one of the two directions, horizontal or vertical, in order to reduce the control time.

The invention will be more readily understood on reading the following description with reference to the accompanying drawings, in which:

FIG. 3a is a view in detail of the end of a particular embodiment of a probe used in the invention and of which the deflection means consist of a prism with total reflection.

FIG. 3b is a schematic view in section of another particular embodiment of the probes used in the invention.

FIG. 3c is a view in detail of the end of a particular embodiment of a probe used in the invention and comprising channels for conducting a fluid adapted to regularise the plane mirror used as deflection means in this probe.

Figure 1:
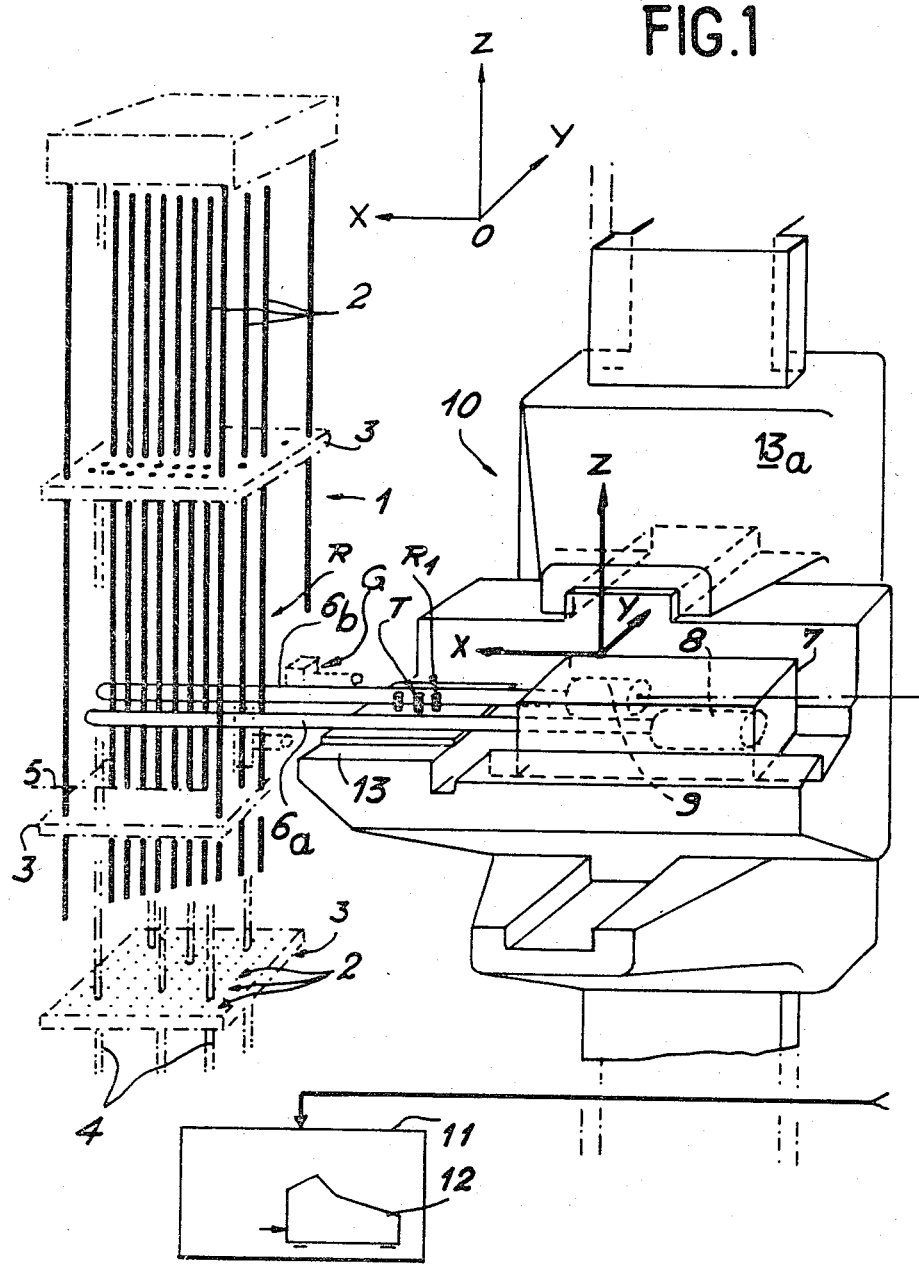
FIG. 1 is a schematic view of a particular embodiment of the device according to the invention for controlling a fuel assembly intended to be placed in the core of a nuclear reactor.

Referring now to the drawings, FIG. 1 shows a particular embodiment of the device forming the subject matter of the invention. This device makes it possible, for example, to control a fuel assembly 1 which has just been made and which is intended to be placed in the core of a nuclear reactor. As has been explained hereinabove, this assembly 1 is formed by parallel pencils 2, of which certain have been removed or cut to render the drawing clearer, regularly spaced apart from one another. The assembly 1 is disposed vertically, parallel to an axis Oz, and has, for example, a square section; it comprises as many pencils in depth, along axis Ox, as in width, along axis Oy (axes Ox, Oy and Oz being perpendicular to one another in two's). Grids 3 maintain it in position. Said grids are perpendicular to the pencils 2. Certain pencils of the assembly 1 are replaced by guide tubes 4 which serve as spacer elements and positioning means. They have a diameter generally larger than that of pencils 2 and constitute the skeleton of the assembly 1. It is desired to control the diameter of all the pencils 2 of the assembly 1 as well as the spaced apart relationship between pencils: to this end, each row 5 of the assembly 1 perpendicular to axis Oy is controlled, then each row perpendicular to axis Ox, at a given vertical level of the assembly 1. The same control may possibly be repeated at other levels. In order to limit these controls in time, the number of devices according to the invention may be multiplied and operated simultaneously, as has already been indicated hereinabove.

The control of the rows for example perpendicular to axis Oy is effected with the aid of the device according to the invention which comprises two flexible probes 6a and 6b disposed parallel to axis Ox, described in detail hereinafter, adapted to transmit a light beam and insertable between the rows 5 of pencils 2, so as to surround one of these rows. These two probes 6a and 6b are fixed on a carriage 7 comprising a laser 8 optically coupled to the first probe 6a and a photodiode 9 optically coupled to the second probe 6b. This carriage 7 forms part of means 10 for displacing the probes 6a and 6b parallel to axis Ox or to axis Oy, so as to be able to control each row perpendicular to axis Oy: the displacement means 10 comprise the carriage 7 for displacing the probes 6a and 6b parallel to the axis Ox and a chassis 13 for displacing these probes parallel to axis Oy. To this end, the carriage 7 is rendered fast with chassis 13 and may move thereon, in translation along axis Ox with the aid of a motor (not shown). Of course, the displacement means 10 may also move the probes 6a and 6b in translation along axis Oz with the aid of vertical translation means 13a, to control the assembly 1 at other levels. In this case, the chassis 13 is rendered fast with these vertical translation means 13a and may move thereon, in translation along axis Oy with the aid of a motor (not shown).

The device forming the subject matter of the invention may comprise, as has already been indicated hereinabove, a mechanical feeler for locating the first row of pencils 2 presenting itself for control and also for measuring a possible buckling of the assembly 1. This feeler is described in FIG. 3d. Furthermore, the device according to the invention may comprise means G for guiding the probes 6a and 6d, described in FIG. 3e.

Electronic means 11 described in detail hereinafter process the electrical signals emitted by the photodiode 9 to furnish information allowing the control to be effected. This information is for example displayed with the aid of a printer 12.

The rows 5 perpendicular to axis Oy are controlled in the following manner: the displacement means 10 enable the probes 6a and 6b to be inserted in the assembly 1, along a row R to be controlled. The control of the pencils 2 of this row R is effected (as will be explained with reference to FIG. 2), whilst the probes withdraw parallel to axis Ox, with the aid of carriage 7, and are finally located outside the assembly 1. By translation parallel to axis Oy, effected with the aid of the chassis 13, the probes are positioned facing the following row and a fresh control can then be made. Said displacements are effected sequentially.

Figure 2:
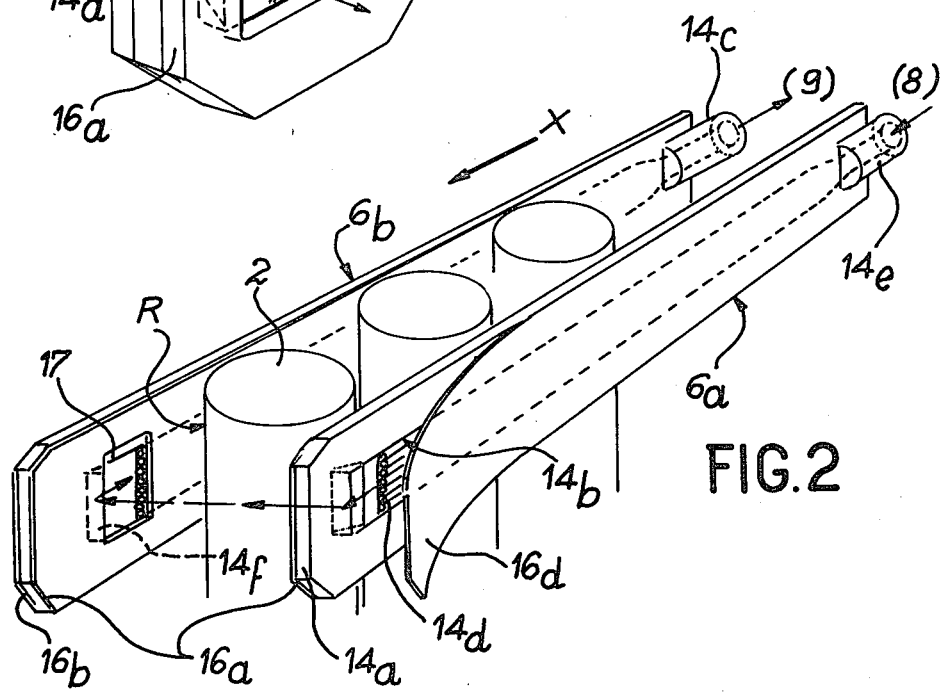
FIG. 2 is a schematic view of a particular embodiment of a pair of probes used in the invention, of which the deflection means consist of a plane mirror and which are positioned to control a row of pencils of the fuel assembly shown in FIG. 1.

FIG. 2 shows the two probes 6a and 6b positioned on either side of the row R to be controlled. This row R is assumed to contain only fuel pencils 2. The probes 6a and 6b have a length (for example 300 mm) greater than that of a row of pencils (row measuring for example 250 mm), in order to be able to "scan" the complete row.

The two probes 6a and 6b are identical. They comprise a flexible metallic blade 14a about 300 mm long and 0.5 mm thick, in the form of an elongated U between the arms of which is inserted a bundle of optical fibres 14b which are therefore parallel to the blade 14a. This bundle of optical fibres 14b has a rectangular section in the blade 14a, which section becomes cylindrical of revolution towards the open end of the U, in order to secure a good optical coupling between the bundle of optical fibres 14b and the laser 8 (or the photodiode 9). The inlet face 14c and outlet face 14d of the bundle of optical fibres 14b are plane and of "optical polish" quality. The end of this bundle 14b located at the open end of the U is taken in a metallic connecting piece 14e enabling the probe (6a or 6b) to be optically coupled to the laser 8 or to the photodiode 9.

Figure 3:
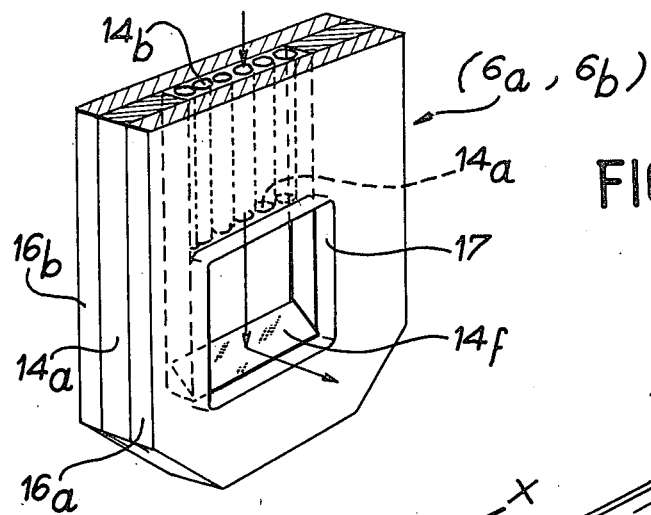
FIG. 3 is a view in detail of the end of a probe shown in FIG. 2.

A plane mirror 14f made of stainless steel is inserted in the flexible metallic blade 14a towards the closed end of the U, in the vicinity of the outlet face 14d, and inclined at 45° with respect to the axis of the optical fibres and to the plane of the blade 14a, so as to return any light beam propagated by these optical fibres in a direction perpendicular thereto and to the plane of the blade 14a. This mirror 14f is also shown in FIG. 3 showing the detail of the closed end of the flexible blade 14a. In order to minimise the losses of light and avoid the divergence of the light beam, the space between the optical fibres and the mirror may be filled with a transparent tight glue; another solution would consist in replacing the mirror 14f by a prism 14g shown in FIG. 3a, connected to the optical fibres and adapted to return, completely, any light beam propagated by the optical fibres, in a direction perpendicular thereto and to the plane of the blade 14a.

Flexible metallic blades 16a and 16b for protection and also for holding the bundle of optical fibres 14b in position are disposed on either side of the metallic blade 14a. They are superposable thereon and have, for example, a thickness of about 0.1 mm. The thickness of the blade 14a-protecting blades 16a-16b assembly is therefore equal to about 0.7 mm, which is clearly less than the minimum distance of about 1.5 mm encountered between two pencils or between a pencil and a guide tube. For other applications, the thickness of the blades 14a, 16a and 16b may be reduced or, on the contrary, increased. An opening 17 is made in one of the protecting blades (blade 16a), opposite mirror 14f, to allow passage of a light beam propagating in the probe 6a or 6b. The dimensions of the mirror 14f are such that this mirror does not pass beyond the blade 14a held between the two protecting blades 16a and 16b. The probes 6a and 6b are disposed so that their mirrors 14f are opposite each other. An embodiment of the invention employing a prism 14g (FIG. 3a) connected to the optical fibres, would have the same requirements.

The diameters of the pencils 2 of row R (FIG. 2) are controlled as follows: the probes 6a and 6b, after having been inserted in the assembly 1 in direction Ox, are withdrawn therefrom by a reverse movement of translation of the carriage 7 (FIG. 1): they then move along the row R. A light beam (FIG. 2), emitted by the laser 8 or any other source adapted to the optical fibres, propagates in the first probe 6a via the bundle of optical fibres 14b, is reflected by the mirror 14f of this probe 6a in the direction of the mirror 14f of the second probe 6b, if it is not occulted by a pencil 2, then transmitted to the photodiode 9 via the bundle of optical fibres 14b of the second probe 6b. The photodiode 9 therefore produces an electrical signal modulated by the successive occultations of the light beam by the pencils 2 during the displacement of the probes 6a and 6b. The electronic means 11 (FIG. 1) process this signal and convert it into electrical pulses of which the number is proportional to the displacement of the probes 6a and 6b (this being explained hereinafter). For example, a pulse corresponds to a displacement of $10^{-2}$ mm. Different numbers of pulses are thus obtained, corresponding to the diameter of the various pencils 2 of the row R and to the distance between these pencils 2.

Furthermore, as has been indicated in FIG. 1, at least two, and preferably three, standard pencils T, forming a row $R_1$, act as references. Their surface state may advantageously be similar to that of the pencils or pieces to be controlled. They are disposed on the chassis 13, forming part of the displacement means 10, on the path of the probes 6a and 6b. Reference pulses corresponding to this "reference row" R are thus provided. All these numbers of pulses are for example displayed with the aid of the printer 12 (FIG. 1). The diameter and the spaced apart relationship of the pencils 2 may thus be compared with the diameter and spaced apart relationship of the standard pencils T. Moreover, knowing the real diameter $d_0$ of these standard pencils T, it is possible to determine the real diameter d of each pencil 2 of the assembly 1 by multiplying $d_0$ by the ratio of the number of pulses corresponding respectively to this pencil 2 and to its homologous standard pencil T. (In the same way, the distances between pencils 2 may be determined).

FIG. 3b schematically shows a particular embodiment (in section) of the probes 6a and 6b in which the flexible blade 14a is grooved, enabling a bundle of optical fibres 14b to be placed therein. A protecting blade 16a, itself flexible, is rendered fast with the flexible blade 14a by brazing, welding or gluing, so that the bundle of optical fibres 14b is surrounded by the two blades 14a and 16a.

FIG. 3c schematically shows a particular embodiment of the probes 6a and 6b, of which only the end is shown, and corresponding to FIG. 3. Two channels 16c enable a fluid to be conducted in the vicinity of the plane mirror 14f, said fluid being adapted to regularise this mirror, i.e. clean it and possibly cool it to avoid it deforming. These two channels 16c are made in the flexible blade 14a and disposed parallel to the bundle of optical fibres 14b. They may also be made in the light conduit formed by the bundle of optical fibres 14b, by eliminating part of these optical fibres. More generally, they may be placed in the light conduit of the probes 6a and 6b, when said conduit is not the bundle of optical fibres 14b.

Figure 3D:
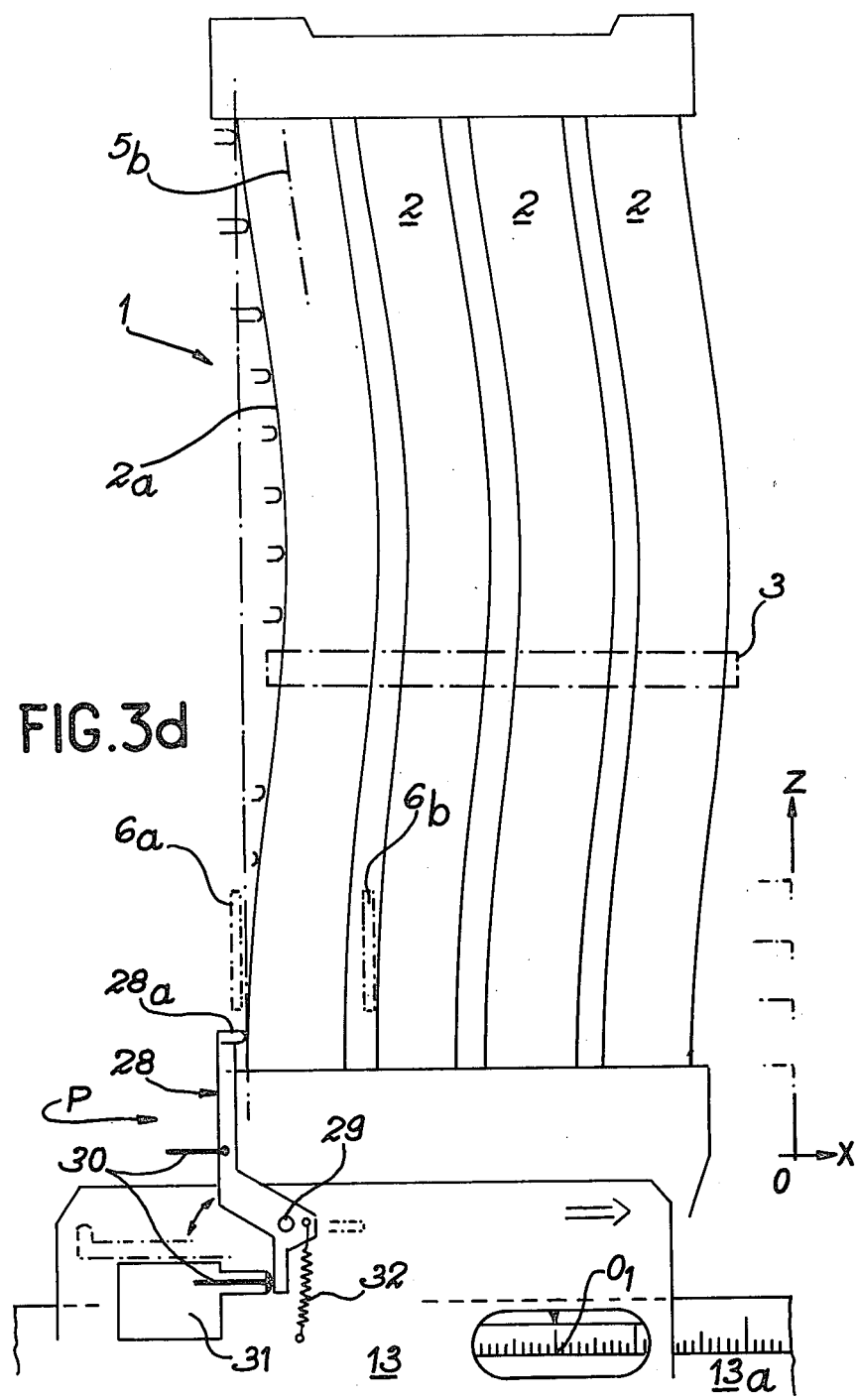
FIG. 3d is a schematic view of a particular embodiment of a mechanical feeler used in a device according to the invention.

FIG. 3d schematically shows a particular embodiment of a mechanical feeler P provided to detect the first row 5b of pencils 2 presenting itself for control and usable in the device shown in FIG. 1. This feeler P mainly comprises a lever 28 bent at its end 28a and rendered fast with the chassis 13 movable along axis Oy, via a pin 29 about which it may pivot. Furthermore, it closes an electric circuit 30, by contact with a microswitch 31. The end 28a of the lever 28 is provided to encounter, when the chassis 13 moves parallel to axis Oy, one of the pencils 2 (for example the first one, 2a) of the first row 5b or face of the assembly 1, presenting itself for control. The lever 28 then retracts, pivoting about the pin 29 and thus switches out the circuit 30 by breaking the contact with the microswitch 31, which therefore enables the first row 5b of pencils 2 to be controlled to be located and stops the movement of translation of the chassis 13, so that this first row 5b can be controlled. Due to a spring 32 fast with the lever 28 and with the chassis 13, this lever 28 may be returned to its initial position when the chassis 13 moves away from the assembly 1 again to make a fresh series of measurements, for example at another level of the assembly 1.

According to known state of the art, the displacement of chassis 13 along axis Oy, with respect to an origin $O_1$ determined on the means 13a for vertical translation (along axis Oz), with respect to which the chassis 13 moves, may also be plotted. This enables the position of a pencil 2 (for example the first one, 2a) of the first row 5b of pencils 2, for a given level of the assembly 1, to be located with respect to this origin $O_1$. The buckling of this assembly 1 may therefore be assessed, by recommencing this locating at different levels, along axis Oz, of the assembly 1. These measurements of buckling may, of course, be recommenced on other faces of the assembly 1.

Figure 3E:
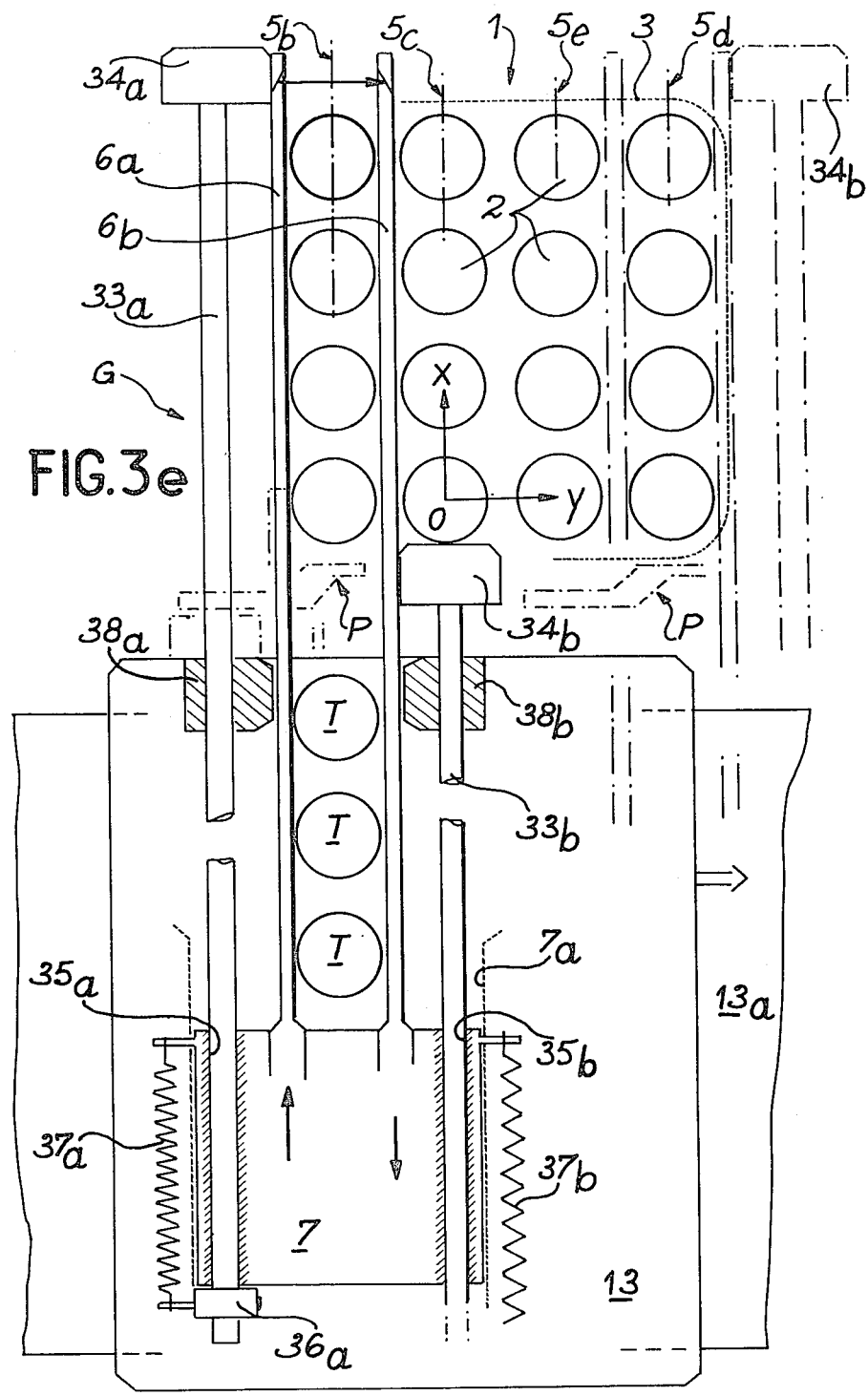
FIG. 3e is a schematic view of a particular embodiment of the probe guiding means used in a device according to the invention.

FIG. 3e shows a particular embodiment of the means G for guiding the probes 6a and 6b which may be used in the device shown in FIG. 1. These guiding means G mainly comprise two parallel rods 33a and 33b, respectively placed on either side of the pair of probes 6a and 6b, parallel to this pair and provided with heels 34a and 34b abutting respectively on the probes 6a and 6b and placed at the end of the rods located towards the assembly 1 of pieces 2. The two rods 33a and 33b are adapted to slide respectively in two bearings 35a and 35b fast with the carriage 7 movable parallel to axis Ox on the chassis 13 in a guide 7a. They are further respectively provided with two stop rings 36a and 36b (36b not being shown in FIG. 3e) placed at the other end of these rods. Two springs 37a and 37b respectively connect the stop rings 36a and 36b to the carriage 7. The two rods 33a and 33b are also adapted to slide respectively in two bearings 38a and 38b fast with the chassis 13 and also abutting respectively on the probes 6a and 6b.

When the probes 6a and 6b are placed opposite the first row 5b of pieces 2 presenting itself for control, the carriage 7 advances towards this row 5b, which brings the probes 6a and 6b as well as the guiding means G closer to this same row 5b. The second probe 6b penetrates in the assembly 1 along the first row 5b and the second 5c. The corresponding heel 34b facilitates this penetration, guides the probe 6b but, for its part, abuts for example against the first pencil of the second row 5c and automatically retracts, the rod 33b sliding in bearing 35b and 38b. The first probe 6a advances along the first row 5b, outside the assembly 1. The corresponding heel 34a facilitates this advance, guiding the first probe 6a and avoiding any deflection thereof along the whole first row 5b.

In comparable manner, during the control of the last rod 5d of the assembly 1, the heel 34a facilitates penetration of the first probe 6a in this assembly 1 and automatically retracts, abutting for example against the first pencil of the second-to-last row 5e. The second heel 34b facilitates the advance of the second probe 6b along the whole of the last row 5d, outside the assembly 1, avoiding any deflection of the second probe 6b.

Finally, during the control of a row of pencils included between the "outer" rows 5b and 5d, the two heels 34a and 34b guide the probes 6a and 6b in their penetration in the assembly 1 and retract when they abut for example against the first pencils of the two rows bordering the controlled row. When the carriage 7 withdraws, the two heels 34a and 34b take back their initial "extended" position due to the return action of the springs 37a and 37b. The probes 6a and 6b are therefore guided and maintained laterally by the guiding means G during the control of any row of pencils 2 of the assembly 1.

Figure 4:
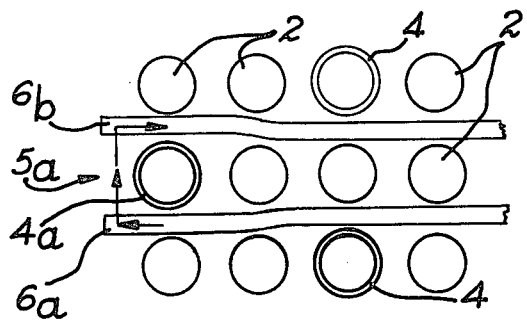
FIG. 4 is a schematic view of a section of the fuel assembly shown in FIG. 1 in a zone comprising spacer elements, the probes being positioned on either side of a row of this zone.

FIG. 4 shows a horizontal section through the fuel assembly 1 of FIG. 1 in a zone comprising guide tubes 4. The probes 6a and 6b are positioned on either side of a row 5a of this zone. This row 5a comprises a guide tube 4a. The flexible probes 6a and 6b do not come into abutment against this guide tube 4a whilst they are being placed in position against the row 5a, but deform slightly due to their flexibility and "pass around" the guide tube 4a. This is an advantage of the invention. (The slight deformation does not prevent the light beam propagating in the first probe 6a from being transmitted to the second probe 6b, taking into account the short distance between the pencils 2). When the fuel assembly 1 comprises guide tubes, the "reference row" may have a configuration representative of the distances and diameters of the guide tubes and the pencils.

Figure 5:
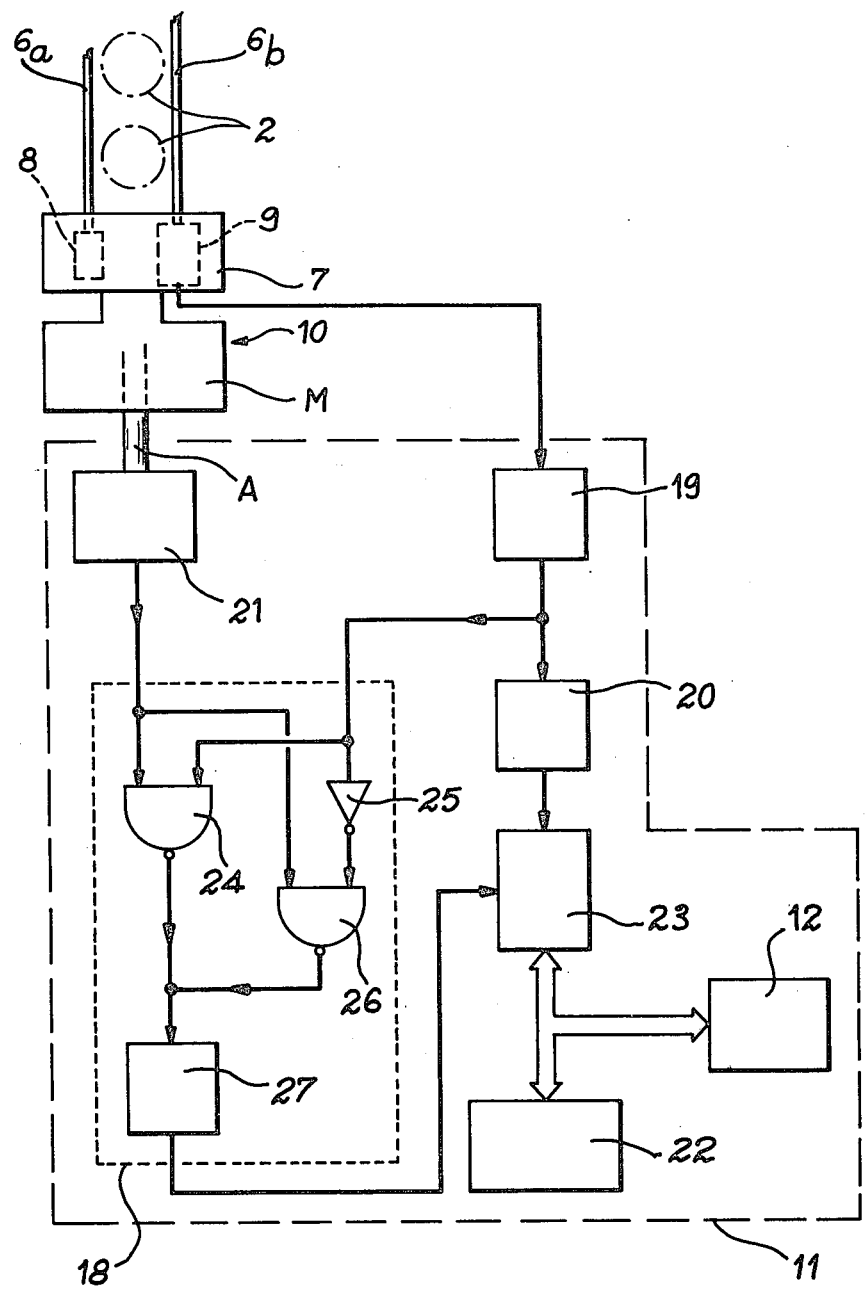
FIG. 5 is a diagram of a particular embodiment of the electronic means used in the invention.

FIG. 5 shows a particular embodiment of the electronic means 11 shown in FIG. 1. They comprise a circuit 19 for amplifying and shaping the electrical signal issuing from the photodiode 9, this signal being emitted as explained hereinabove, as well as a derivative circuit 20 for the amplified and shaped signal.

They also comprise an incremental coder 21, of type known in the state of the art, mounted at the end of the shaft A of a step-by-step motor animating the carriage 7 (and therefore the probes 6a and 6b) by a uniform movement of translation parallel to axis Ox of FIG. 1, for the probes to penetrate in the assembly 1 shown in said FIG. 1. This incremental coder 21 delivers electrical pulses of which the number is proportional to the displacement of the probes in translation. To have a good resolution, the number of pulses per millimeter may typically be chosen in the range of 100 to 400 pulses per millimeter.

They further comprise means 18 for counting the number of pulses corresponding to a pencil 2 and the number of pulses corresponding to the distance between two pencils 2 (described in detail hereinafter), these counting means 18 being connected to the output of the incremental coder 21 and to that of the amplifying and shaping circuit 19.

Finally, they comprise a memory 22 for recording these numbers of pulses, means 23 for controlling this memory 22 (read-out, read-in and addressing of the memory 22) connected to the output of the counting means 18 and to that of the derivative circuit 20, and the printer 12, connected to the means 23 for controlling the memory 22 and to the latter.

The counting means 18 comprise:
a first gate 24 of AND type of which one input is connected to the output of the incremental coder 21 and of which the other input is connected to the output of the amplifying and shaping circuit 19,
an inverter circuit 25, of type known in the state of the art, of which the input is connected to the output of the amplifying and shaping circuit 19,
a second gate 26 of AND type of which an input is connected to the output of the incremental coder 21 and of which the other input is connected to the output of the inverter circuit 25, and
a pulse counter 27, of type known in the state of the art, of which the input is connected to the output of the two gates 24 and 26 of AND type and of which the output is connected to the means 23 for controlling the memory 22.

The electronic circuits 11 also comprise known circuits (not shown in FIG. 5) for synchronisation, which enable the means 23 for controlling the memory 22 and the printer 12 to be monitored.

Figure 6:
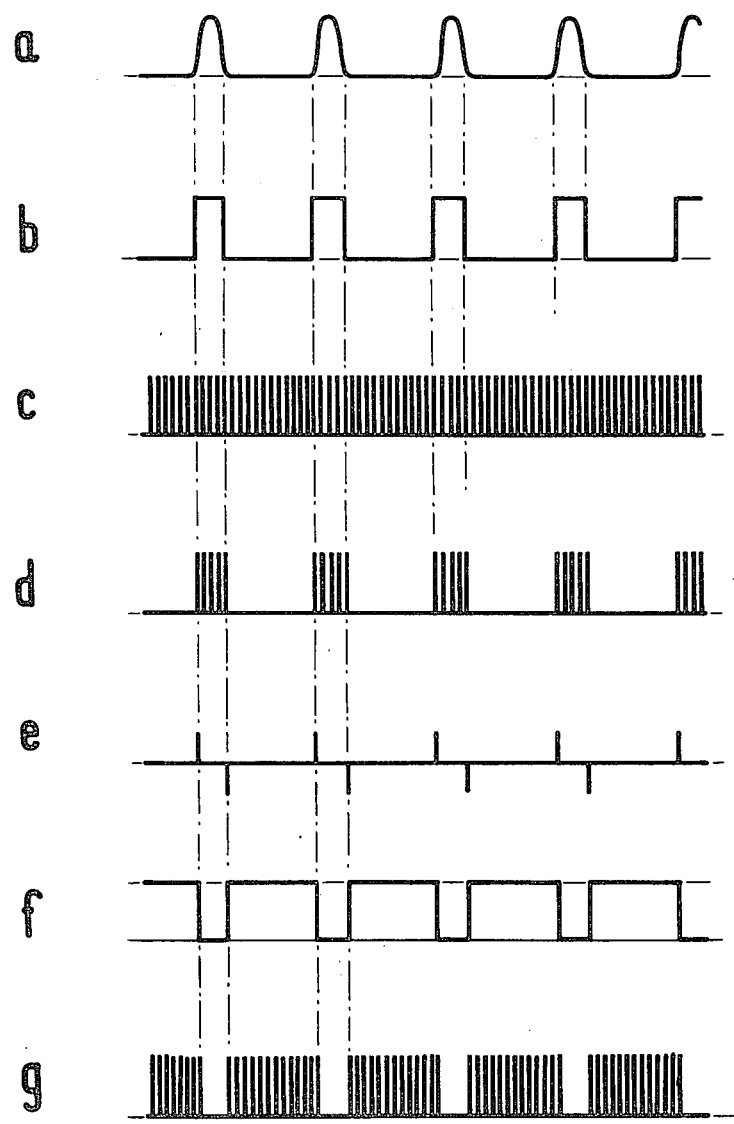
FIGS. 6a to 6g show timing charts of the electrical signals produced by particular electronic elements of the diagram of FIG. 5.

During the movement of translation of the probes 6a and 6b, the photodiode 9 produces a modulated electrical signal, as has been seen hereinabove with reference to FIG. 2. This electrical signal "in imperfect square wave form" (these "square waves" corresponding to the gaps between fuel pencils) is shown in FIG. 6a. It is amplified and shaped by the amplifying and shaping circuit 19 at the output of which the square wave signal shown in FIG. 6b is obtained.

The incremental coder 21 produces pulses which are shown in FIG. 6c, as has been shown hereinabove.

The first gate 24 of AND type, of which the inputs are respectively connected to the output of the incremental coder 21 and to that of the amplifying and shaping circuit 19, therefore produces batches of pulses, as has been indicated in FIG. 6d, the number of pulses of such a batch being proportional to the spaced apart relationship between two fuel pencils.

Furthermore, the derivative circuit 20, of which the input is connected to the output of the amplifying and shaping circuit 19, therefore produces the derivative shown in FIG. 6e of the square wave signal of FIG. 6b. This derivative circuit therefore makes it possible to "locate" each fuel pencil and furnishes pulses for controlling the addressing and read-in control means of the memory 22. Numbers of pulses corresponding to the different distances between fuel pencils may thus be recorded in this memory 22, these pulses being counted by the pulse counter 27.

Similarly, numbers of pulses corresponding to the fuel pencils may be recorded:

The inverter circuit 25 of which the input is connected to the output of the amplifying and shaping circuit 19, produces a square wave signal (these square waves corresponding to the fuel pencils) shown in FIG. 6f. This is the signal "complementary" of the signal of FIG. 6b. The second gate 26 of AND type, of which the inputs are respectively connected to the output of the incremental coder 21 and to that of the inverter circuit 25, therefore produces batches of pulses as indicated in FIG. 6g, the number of pulses of such a batch being, in this case, proportional to the diameter of a fuel pencil. This number of pulses may then be recorded in the memory 22, as has been explained hereinabove with reference to the distances between pencils.

The device according to the invention may, of course, be arranged to control the pencils of a fuel assembly having already been used and placed in a transparent medium other than air: for example in the pool of a nuclear reactor. This necessitates optical fibres having a good resistance to radiations (fibres made of a doped glass, stabilised glass or silica glass) or resistant light conduits. The device according to the invention may also be arranged to operate at very low temperatures or, on the contrary, at very high temperatures: for example −50° C. or +500° C. The probes of the device according to the invention may, of course, be mass produced and replaced whenever necessary. The device according to the invention may also comprise, as has already been indicated hereinabove, several pairs of probes in parallel, fixed on the same carriage and introduced simultaneously between the rows of pencils: for example, 8 pairs of probes for an assembly comprising 17 pencils in width and in depth. The control time is then reduced. The probes are, in this way, not exposed too much to the radiations emitted by the radioactive pencils. The life expectancy of these probes is then increased. As regards the electronic means described hereinabove, the use of a plurality of pairs of probes necessitates the use of multiplexer circuits between the derivative circuit and the memory control means and between the counting means and these same control means.

The device according to the invention may also comprise means (known in the state of the art) for automatically controlling the means for displacing the probes, allowing a predetermined scanning to be made of a bundle of pieces such as a fuel assembly. The device according to the invention may thus enable each row of pencils at a given level of said fuel assembly to be automatically controlled and possibly recommence control at different levels, replacing the printer by processing means, which may be made by the man skilled in the art, for comparing the information collected on the fuel assembly with prerecorded information concerning a standard assembly acting as reference.

Finally, the device according to the invention may comprise safety means stopping the displacement of the probes when there is a difficulty in introducing these probes in a bundle of pieces. An electrical contactor may for example be placed at the end of the probes. Deterioration of these probes is thus avoided.

The device according to the invention therefore makes it possible to make a quantitative control and not a simple visual control of the diameter of the pencils of a fuel assembly and of the distance between pencils (or, of course, a control of the dimensions and spaced apart relationship of other cylindrical pieces disposed in a bundle) by "optical" and not mechanical feeler means, with the aid of electronic means. This device presents the advantage, inter alia, of using flexible probes for this feeling operation which enables them for example to "pass round" the guide tubes encountered on their path in the fuel assembly.

We claim:

1. Device for controlling the dimensions and spaced-apart relationship of rigid pieces disposed in a bundle of rows, said device comprising at least one pair of probes consisting of a first probe able to emit a light beam and of a second probe able to pick up said light beam, said probes being intended for surrounding a piece to be controlled, and for each of these pairs;
   means for displacing the probes transversely to the piece to be controlled;
   a photodetector to receive the light beam picked up by the second probe and to produce an electrical signal; and
   electronic means for processing this signal, furnishing information for controlling the dimensions of the piece due to the modulation of said signal, provoked by the occultation of the light beam by said piece, said occultation being obtained by the displacement of the probes transversely to this piece,
   wherein each probe comprises a light conduit which is supple and insertable between rows of pieces to be controlled, said electronic means then making it possible to also control the spaced-apart relationship of the pieces.

2. The device of claim 1, wherein each light conduit is integral with a flexible blade, which is terminated by means for deflecting this light.

3. The device of claim 2, wherein said flexible blade is surrounded by two protecting blades, themselves flexible, of which one is perforated opposite the deflecting means.

4. The device of claim 1, wherein each light conduit is placed in a flexible blade which is grooved for this purpose and terminated by means for deflecting light, and wherein a protecting blade, itself flexible, is on the one hand integral with the flexible blade, so that the light conduit is surrounded by said flexible blade and said protecting blade, and on the other hand perforated opposite the deflecting means.

5. The device of claim 2, wherein the deflecting means comprises a mirror inclined at 45° with respect to the axis of the light conduit and to the plane of the flexible blade.

6. The device of claim 2, wherein the deflecting means comprises a prism.

7. The device of claim 2, wherein the probes are provided with at least one channel for conducting in the vicinity of the deflecting means a fluid adapted to regularize these deflecting means.

8. The device of claim 2, wherein each light conduit comprises at least an optical fiber.

9. The device of claim 8, wherein the deflecting means comprise a mirror inclined at 45° with respect to the axis of the light conduit and to the plane of the flexible blade, said mirror having a very limited height, so as to limit a light beam coming out of said light conduit.

10. The device of claim 9, wherein a transparent material is interposed between each optical fiber and said mirror.

11. The device of claim 8, wherein said first probe is optically coupled to a laser in order to emit a light beam with a high intensity.

12. The device of claim 11, wherein each light conduit comprises a bundle of optical fibers, wherein the bundle of optical fibers belonging to the first probe has a cylindrical section towards the laser and a rectangular section towards the deflecting means associated with the first probe and wherein the bundle of optical fibers belonging to the second probe has a cylindrical section towards the photodetector and a rectangular section towards the deflecting means associated with the second probe.

13. The device of claim 1, wherein the dimensions and the spaced-apart relationship of the pieces of a row are controlled from reference values with the help of at least two standard pieces disposed on the path of the probes to effect control by comparison of the information concerning the pieces with that concerning the standard pieces.

14. The device of claim 1, wherein it further comprises a retractable mechanical feeler provided to locate the first row of pieces presenting itself for control.

15. The device of claim 1, wherein it further comprises means for guiding the probes in order to facilitate introduction thereof in the bundle of pieces.

16. The device of claim 1, wherein the electronic means comprise:
   a circuit for amplifying and shaping the signal issuing from the photodetector;
   a derivative circuit for the amplified and shaped signal;
   an incremental coder coupled to the means for displacing the probes and furnishing electrical pulses whose number is proportional to the displacement of the probes along a row of pieces;
   means for counting the number of pulses corresponding to a piece and the number of pulses corresponding to the distance between two pieces, these counting means being connected to the output of the incremental coder and to that of the amplifying and shaping circuit;
   a memory for recording these numbers of pulses;

means for controlling this memory connected to the output of the counting means and to that of the derivative circuit; and means for processing the information contained in the memory.

17. The device of claim 16, wherein said processing means are display means.

18. The device of claim 16, wherein the counting means comprise:

a first gate of AND type of which one input is connected to the output of the incremental coder and of which the other input is connected to the output of the amplifying and shaping circuit;

an inverter circuit of which the input is connected to the output of the amplifying and shaping circuit;

a second gate of the AND type of which one input is connected to the output of the incremental coder and of which the other input is connected to the output of the inverter circuit; and a pulse counter of which the input is connected to the output of the two gates of the AND type and of which the output is connected to the memory control means.

19. The device of claim 1, wherein it further comprises means for automatically controlling the probe displacement means, making it possible to effect a predetermined scanning of the bundle of pieces.

20. The device of claim 1, wherein it further comprises safety means for stopping the displacement of the probes when there is a difficulty in introducing these probes in the bundle of pieces.

21. The device of claim 1, wherein it comprises several pairs of associated probes disposed along at least one flat level perpendicular to one of the two directions, horizontal or vertical, in order to reduce the control time.

22. A device for controlling the diameter and spaced-apart relationship in the pencils of a fuel assembly of a nuclear reactor, said pencils being disposed in a bundle of rows, said device comprising at least one pair of probes consisting of a first probe able to emit a light beam and of a second probe able to pick up said light beam, said probes being intended for surrounding a pencil to be controlled, and for each of these pairs:

means for displacing the probes transversely to the pencil to be controlled;

a photodetector to receive the light beam picked up by the second probe and to produce an electrical signal; and electronic means for processing this signal, furnishing information for controlling the diameter of the pencil due to the modulation of said signal provoked by the occultation of the light beam by said pencil, said occultation being obtained by the displacement of the probes transversely to this pencil, wherein each probe comprises a light conduit which is supple and insertable between rows of pencils to be controlled, said electronic means then making it possible to also control the spaced-apart relationship of the pencils.

* * * * *

UNITED STATES PATENT AND TRADEMARK OFFICE
CERTIFICATE OF CORRECTION

PATENT NO. : 4,464,332
DATED : August 7, 1984
INVENTOR(S) : Lucien Boisseuil et al.

It is certified that error appears in the above-identified patent and that said Letters Patent are hereby corrected as shown below:

Column 2, line 9, "but" should be inserted after "not,".

Column 5, line 66, "secure" should read as "insure".

Column 9, line 2, "against" should read as "along".

Column 10, line 7, "shown hereinabove." should read as "seen hereinbefore."

Claims

Claim 22, Column 14, line 9, "in" should read as "of".

Signed and Sealed this

Nineteenth Day of February 1985

[SEAL]

Attest:

DONALD J. QUIGG

Attesting Officer  Acting Commissioner of Patents and Trademarks